(12) United States Patent
Cole et al.

(10) Patent No.: US 7,006,445 B1
(45) Date of Patent: Feb. 28, 2006

(54) DEVICE AND METHOD FOR DETERMINING CHARACTERISTICS OF A DIGITAL SUBSCRIBER LINE

(75) Inventors: Terry L. Cole, Austin, TX (US); Russell W. Bell, Wall, NJ (US)

(73) Assignee: Legerity, Inc., Austin, TX (US)

(*) Notice: Subject to any disclaimer, the term of this patent is extended or adjusted under 35 U.S.C. 154(b) by 941 days.

(21) Appl. No.: 09/627,680

(22) Filed: Jul. 28, 2000

Related U.S. Application Data

(63) Continuation-in-part of application No. 08/888,766, filed on Jul. 7, 1997, now abandoned.

(51) Int. Cl.
*G01R 31/08* (2006.01)

(52) U.S. Cl. .............. 370/247; 370/248; 379/22.03

(58) Field of Classification Search .......... 370/247, 370/241, 246, 248, 249, 250, 251, 252, 295, 370/401, 468, 540, 465, 242, 241.1, 245; 379/9, 93.14, 29.01, 22.04, 93.07, 22, 30, 379/10.03, 28, 22.06, 21, 27.01, 24, 27, 29, 379/22.02, 22.03, 26.01, 27.03, 12, 15.05, 379/32.01, 32.02, 32.03, 32.04, 32.05; 375/211, 375/295, 222, 231, 224, 260, 229, 354, 377; 725/106; 361/42; 340/514; 709/230
See application file for complete search history.

(56) References Cited

U.S. PATENT DOCUMENTS 4,924,489 A * 5/1990 Lawrence et al. ....... 379/22.06

(Continued)

FOREIGN PATENT DOCUMENTS

EP    1 005 209 A2    5/2000

WO    WO 95/31865    * 11/1995

OTHER PUBLICATIONS

PCT International Search Report dated Apr. 19, 2002 (PCT/US 01/ 14550).

*Primary Examiner*—Phirin Sam
(74) *Attorney, Agent, or Firm*—Williams Morgan & Amerson, P.C

(57) ABSTRACT

A method for determining the suitability of a copper line, used for transmitting voice band signals and having one or more user devices coupled thereto for transmitting signals on the copper line, for use in transmitting data signals out-of-band with the voice band signals is provided. The method includes applying a test signal at one point in the copper line. The test signal has a known relationship to a particular out-of-band data transmission scheme. A response of the copper line to the test signal is monitored, as influenced by the one or more user devices. The monitoring takes place at about the point where the test signal was applied. The suitability of the copper line for data transmission using the particular out-of-band data transmission scheme is determined based on the monitored response of the copper line. A method for determining the suitability of a communication line for transmitting data using an out-of-band data transmission protocol is provided. The communication line has a plurality of user devices attached thereto, and the method includes providing a test signal on the communication line having a known relationship to the out-of-band data transmission protocol; monitoring a response of the communication line to the test signal as influenced by the user devices; determining the suitability of the communication line for use in transmitting data signals using the particular out-of-band data transmission protocol based on the response; disconnecting at least one of the user devices from the communication line; and repeating the providing, monitoring, and determining steps to determine if the at least one user device disconnected from the communication line is an interfering device.

37 Claims, 7 Drawing Sheets

U.S. PATENT DOCUMENTS

| | | | |
|---|---|---|---|
| 5,383,177 A * | 1/1995 | Tateishi | 370/250 |
| 5,892,756 A * | 4/1999 | Murphy | 370/241 |
| 5,903,625 A * | 5/1999 | May | 379/21 |
| 6,014,425 A | 1/2000 | Bingel et al. | 379/27 |
| 6,047,051 A * | 4/2000 | Ginzboorg et al. | 379/130 |
| 6,111,936 A | 8/2000 | Bremer | 379/28 |
| 6,137,839 A * | 10/2000 | Mannering et al. | 375/260 |
| 6,181,775 B1 * | 1/2001 | Bella | 379/29.01 |
| 6,212,258 B1 * | 4/2001 | Bella et al. | 379/29.01 |
| 6,215,855 B1 * | 4/2001 | Schneider | 379/22 |
| 6,252,503 B1 * | 6/2001 | Berger et al. | 340/514 |
| 6,278,769 B1 * | 8/2001 | Bella | 379/29.11 |
| 6,452,767 B1 * | 9/2002 | Brooks | 361/42 |
| 6,477,238 B1 * | 11/2002 | Schneider et al. | 379/22.04 |
| 6,480,575 B1 * | 11/2002 | Chea et al. | 379/9 |
| 6,549,610 B1 * | 4/2003 | Kikui | 379/29.01 |
| 6,553,105 B1 * | 4/2003 | Chea et al. | 379/93.14 |
| 6,574,309 B1 * | 6/2003 | Chea et al. | 379/9 |
| 6,584,148 B1 * | 6/2003 | Zitting et al. | 375/222 |

* cited by examiner

DEVICE AND METHOD FOR DETERMINING CHARACTERISTICS OF A DIGITAL SUBSCRIBER LINE

CROSS REFERENCE TO RELATED APPLICATION

This application is a continuation-in-part of application Ser. No. 08/888,766 filed Jul. 7, 1997, now abandoned.

BACKGROUND OF THE INVENTION

1. Field of the Invention

This invention relates generally to communications systems and, more particularly, to a device and method for determining characteristics of an existing wire network to determine the suitability of the wire network for use with various data transmission technologies.

2. Description of the Related Art

Over the last few years, the demand for high speed communication applications has exploded. The Internet, for example, has grown at astronomical rates over the past several years. A significant number of new Internet subscribers connect from a home or small office using a personal computer (PC). One drawback typically associated with home and small office Internet connections is the relatively slow speeds at which data is transferred between the Internet service provider and the subscriber's PC.

The relatively low data transfer speeds associated with home, PC-based Internet connections are primarily the result of the low-bandwidth capabilities of the wiring used to connect the PC to the Internet service provider. More particularly, a data "bottleneck" is introduced by the copper wiring used to connect the central office (CO) of the telephone company to the home.

Until recently, few options have been available to the home or small business user to increase the data transfer bandwidth. Users could purchase expensive, dedicated T-1 or frame relay lines that have relatively high bandwidths (e.g., 1.5 Mbps). The cost of such lines, however, are prohibitive for most home uses. Accordingly, most telecommuters, mobile users, and small office/home office (SOHO) users must use a lower bandwidth data transfer technology such as 56 kbps asynchronous modem connections, integrated services digital networks (ISDN), and the like.

One suggestion to increase the bandwidth for home uses is to provide high bandwidth lines (e.g., optical cabling) directly to the home. Such an approach is very expensive since extremely large amounts of new optical cabling or wiring must be installed. Such an approach also ignores the value of the existing copper infrastructure already in place around the world. The existing copper networks have an undepreciated world-wide value estimated at over 600 billion dollars. There are approximately 700 million existing local copper loops around the world, and over 160 million in the United States. The principle difficulty in exploiting the copper wiring infrastructure is the traditionally low bandwidth data transmission capability of the twisted-pair copper wiring local loop that form the final link between the CO and the home.

Recently, digital subscriber line (xDSL) technologies have been developed to provide high-speed data transmission from the service provider (e.g., the CO) to the customer premise over the existing twisted-pair copper wiring conventionally used for telephone service. Such xDSL technologies leverage modem technology to increase the data transfer bandwidth of the twisted-pair copper wiring. Typically, xDSL modems are provided on the ends of the subscriber line copper wiring to communicate between the CO and the customer's premise. The manner in which the two modems communicate is established by the particular xDSL approach used. Because the existing telephone wire is used, xDSL technologies data signals are typically transferred out-of band with the voice band signals. Because different frequencies are used for the voice band and the data band, voice and data information can be concurrently transferred over the twisted-pair copper line. In a typical xDSL example, voice information may be carried in frequency bands below 4 kHz with data being carried in frequencies above the voice band, typically from 50 kHz to 1 MHz.

While xDSL technologies may be implemented in a number of different forms, each approach typically uses an xDSL model at the customer premise that communicates with an xDSL modem at the CO of the telephone company. At the CO, data transmitted over the subscriber line using xDSL technologies is communicated to Internet or other intranet services, for example, over high-speed wide area network (WAN) services, such as frame relay or ATM services. Different competing forms of digital subscriber line technologies are collectively designated as xDSL technologies where the "x" represents various one or more letter combinations that are used in front of the "DSL" acronym in order to designate the type of technology being used. Some of the more prevalent xDSL technologies currently being considered include HDSL, ADSL, SDSL and VDSL. To facilitate a better understanding of xDSL technology, a brief discussion of some of the differences between a few examples is set out below.

HDSL (High Data-rate Digital Subscriber Line) has been used as a low-cost substitute for Ti lines in symmetrical business-oriented wide area network (WAN) applications. HDSL typically supports 768 kbps full-duplex communication over a single twisted pair, T-1-speeds over two twisted pairs, and E2 speeds over 3 pairs. SDSL (Single-line Digital Subscriber Line) is well suited for home use or other small subscriber premises and provides T-1 or E1 date transmission speeds over a single twisted-pair copper line. SDSL supports standard voice band data transmissions and T-1/E-1 data band transmission simultaneously over the same line. ADSL (Asymmetric Digital Subscriber Line) exploits asymmetric upstream and downstream data transmission rates to increase the amount of data that may be delivered to the subscriber's premise. ADSL allocates the larger portion of the bandwidth to downstream traffic, providing rates ranging from Ti to 9 Mbps downstream and 16 to 640 kbps upstream. ADSL technologies typically use either carrierless amplitude-phase (CAP) modulation or discrete multitone (DMT) modulation techniques. ADSL technology is especially suited for connecting to a customer premise where, as is often the case in Internet applications, a significantly larger portion of data transfers are provided from the service provider to the customer premise than from the customer premise to the service provider.

A number of factors effect the data transmission rates that can be used. For example, the rate depends on the length and gauge of the twisted-pair copper line used for transmission. Table 1 lists exemplary lines widths and downstream data transmission rates using ADSL technology on a typical 24-gauge twisted-pair copper subscriber line.

TABLE 1

| Line Length | Down Stream Data Rate |
| --- | --- |
| 18,000 feet | 1.544 Mbps (T1) |
| 16,000 feet | 2.048 Mbps (E1) |
| 12,000 feet | 6.312 Mbps (DS2) |
| 9,000 feet | 8.448 Mbps (E2) |

As will be appreciated from the above-description, a number of different technologies may be used to transmit data over existing twisted-pair lines. The various technologies range, for example, from voice band modems having transmission speeds as low as 1,200 bps up to VDSL out-of-band technologies having downstream data transmission speeds from 13 to 52 Mbps. The ability to use the various schemes depends on a number of factors including, for example, the twisted-pair copper wiring length and gauge and overall structure of the wiring. As a result not all technologies can be used on a given digital subscriber line. It is difficult to determine which, if any, data scheme would be appropriate for a particular subscriber. Moreover, the characteristics of the line may change with time.

Another variable affecting the suitability of a particular customer premise is the specific telephonic and computer related equipment coupled to the copper network within the customer premise. Telephonic devices typically operate in one of two states, a high-impedance on-hook state and a lower impedance off-hook state. A ringing signal sent over the subscriber line to activate the telephonic devices is typically on the order of 100–200 volts. Typical telephonic devices include protective circuitry adapted to dissipate transient energy (e.g., due to line faults, lightning, etc.) encountered on the subscriber line to prevent damage to its internal components. The particular points at which such protective circuitry activates varies widely among the various telephonic devices available. Out-of-band transmission protocols, under certain conditions, have been found to inadvertently activate these protective circuits. These characteristics of the telephonic devices are referred to as non-linear characteristics. The non-linear characteristics may deleteriously affect or limit the use of out-of-band transmission schemes at the customer premise. Due to the widely distributed, non-standardized responses of the telephonic devices, it has proven extremely difficult to establish a model of the non-linear characteristics.

The present invention is directed to overcoming, or at least reducing the effects of, one or more of the problems set forth above.

SUMMARY OF THE INVENTION

One aspect of the present invention is seen in a method for determining the suitability of a copper line, used for transmitting voice band signals and having one or more user devices coupled thereto for transmitting signals on the copper line, for use in transmitting data signals out-of-band with the voice band signals. The method includes applying a test signal at one point in the copper line. The test signal has a known relationship to a particular out-of-band data transmission scheme. A response of the copper line to the test signal is monitored, as influenced by the one or more user devices. The monitoring takes place at about the point where the test signal was applied. The suitability of the copper line for data transmission using the particular out-of-band data transmission scheme is determined based on the monitored response of the copper line.

Another aspect of the present invention is seen in a method for determining the suitability of a communication line for transmitting data using an out-of-band data transmission protocol. The communication line has a plurality of user devices attached thereto, and the method includes providing a test signal on the communication line having a known relationship to the out-of-band data transmission protocol; monitoring a response of the communication line to the test signal as influenced by the user devices; determining the suitability of the communication line for use in transmitting data signals using the particular out-of-band data transmission protocol based on the response; disconnecting at least one of the user devices from the communication line; and repeating the providing, monitoring, and determining steps to determine if the at least one user device disconnected from the communication line is an interfering device.

BRIEF DESCRIPTION OF THE DRAWINGS

The invention may be understood by reference to the following description taken in conjunction with the accompanying drawings, in which like reference numerals identify like elements, and in which.

Figure 1:
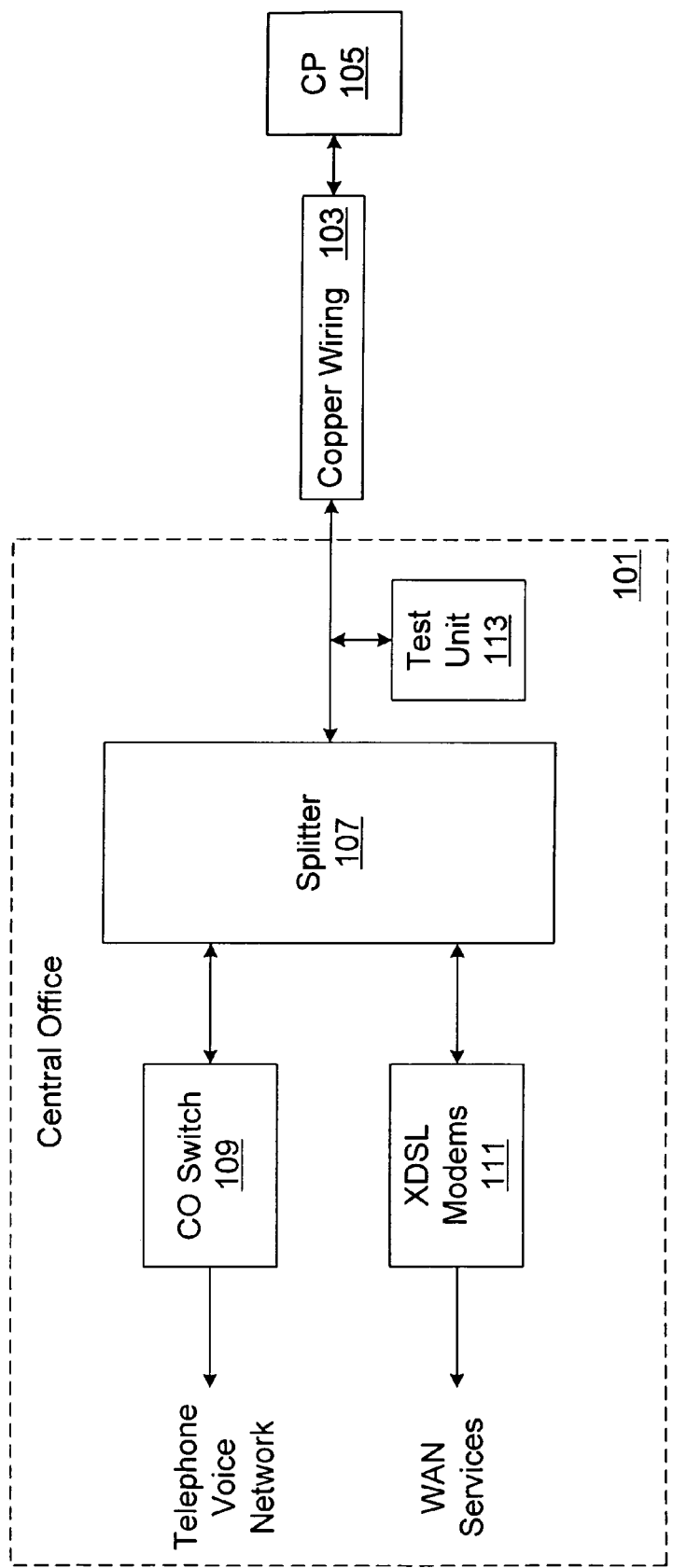
FIG. 1 is a simplified block diagram of a system for determining the suitability of a copper network for particular data transmission scheme in accordance with an embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention applies to a variety of environments where it is desirable to determine the suitability of an existing wiring network for out-of-band data transmission schemes. The invention is particularly suited for detecting the suitability of existing subscriber line twisted-pair copper wiring for use as a transmission medium for xDSL data transmission technologies. While the present invention is not so limited, an appreciation of various aspects of the invention is best gained through a discussion of various application examples operating in such environments.

One particular embodiment of the invention is illustrated in FIG. 1. In this particular example, a central office (CO) 101 of a telephone company is connected via a copper wiring network 103 to a customer premise 105. The CO 101 has the capability of providing standard telephone services as well as high-rate data transmissions using xDSL technologies. The CO 101 includes a splitter 107 to divide signals received from the customer premise 105 into voice and data applications. The splitter 107 permits subscribers using xDSL data transmission technology to talk on the phone at the same time they are connected to the Internet, for example.

The splitter 107 supplies voice band signals to a standard CO switch 109 that connects the voice band signals to an appropriate destination using a standard public switched telephone network (PSTN), for example. The splitter 107 provides data band signals received from a subscriber to a bank of xDSL modems 111. The type of xDSL modem used in the CO corresponds to the type of xDSL modem used by a subscriber. For example, if a subscriber utilizes an ADSL modem to communicate with the CO, an ADSL modem is also provided in the xDSL modem bank 111. The data band signals from the subscriber are transmitted to the appropriate ADSL modem at the CO 101. In this manner, a communication path is established over the subscriber line between two xDSL modems.

In the embodiment of FIG. 1, the CO 101 also includes a test unit 113. The test unit 113 is used to test the suitability of an existing copper subscriber line local loop that connects the CO 101 to a particular subscriber for xDSL transmissions. As used herein and described more fully below, copper wiring 103 of subscriber line includes the twisted-pair connecting the subscriber to the CO 101 (i.e., which may be as long or longer than 18,000 feet) as well as the twisted pair-copper wiring within the customer premises used to connect various user devices to the CO. The user devices or customer premise equipment (CPE) coupled to the copper wiring 103 may include, for example, telephones, computers, fax machines, and the like as described more fully below.

When both voice and out-of-band data signals are transmitted over the common transmission medium, perhaps simultaneously, consideration must be given to whether the voice band and data band signals will interfere with each other or otherwise influence the ability of the customer premise equipment coupled to the line to properly handle the respective type of data. High frequency out-of-band data signals transmitted to or from a PC, for example, may enter into a telephone connected to the copper wiring 103 causing interference with voice band signals. For example, subscriber equipment such as a telephone unit or other device that plugs into the line may have a non-linear characteristic. It is possible that the non-linearity may cause the modulated out-of-band data signals to be demodulated into signals that enter the voice band signal causing audible noise in the telephone. Similarly, voice band signals and ringing signals associated with a telephone, may interfere with a data stream intended for a PC.

In certain instances, it may be necessary to provide an appropriate filter between the copper wiring and the customer premise equipment to filter out interference from other device. For example, a low-pass filter could be coupled between the copper wiring and a telephone to filter out interference from data signals. Similarly, a high pass filter could be provided between the copper wiring and a PC. The filters could be provided within a splitter arrangement that would receive both voice and data band signals transmitted on the twisted-pair copper wiring and have an output from a low pass filter and from a high pass filter. A more detailed description of filter and splitter arrangements adapted for use in the small office/home office (SOHO) environment is described in commonly assigned copending patent application by the same inventor, Ser. No. 08/888,870, entitled "Device and Method for Isolating Voice and Data Signals on a Common Carrier," filed Jul. 7, 1997.

Not all customer premise equipment may require filtering. For example, certain telephone sets may not require filters since their construction presents a high input impedance to signals in the data band. In such instances, a filter may not be required. Because of the many different types of customer premise equipment that may be connected to the copper wiring, it is difficult to predict how each device may influence the suitability of the copper wiring for a particular out-of-band data transmission scheme. Thus, it is difficult to determine by simply evaluating line lengths and wire gage whether or not a particular data transmission scheme will work, or whether some form of filter or splitter is required.

As noted above, the test unit 113 tests the suitability of the copper wiring for use with various data transmission schemes. The test unit 113 injects various test signals into the copper wiring 103 and monitors the response of the copper wiring to the test signals. For example, the test unit 113 may measure the amount of current drawn by the copper wiring under various conditions representative of the data transfer scheme being tested. The test unit 113 may inject modulated signals at different frequencies and voltage levels and monitor the response of the copper wiring. The signals may be in the out-of-band data frequencies only or may also include voice band frequencies. The test unit 113 can monitor and determine whether or not a particular signal in one band will be demodulated or otherwise cause interference in another band.

In certain instances, the test unit 113 may also account for the actual length of the copper wiring used for the subscriber line as well as other characteristics that may prevent the use of or otherwise reduce the various types of data transmission schemes that may be used. Using the data obtained from the test unit 113, the service provider can determine in advance of actually implementing a particular service whether the copper wiring of a particular subscriber line is suitable for a desired data transmission scheme. The service provider may also use the monitored results to make a determination of whether filters and/or splitters would be required. This allows the service provider to make any necessary adjustments or recommendations when a subscriber requests a particular data service.

The test unit 113 may also be used by the service provider or network operator to periodically monitor for changing conditions in the subscriber's network. For example, a network that is initially suitable for a particular data service, may subsequently become inappropriate in view of changes introduced by the addition of a new telephone, a telephone answering machine, a new computer, or the like. Any of such changes could influence the copper wiring such that a particular data transmission scheme would not work correctly. In response to such an indication, the service provider may dispatch a truck to install filter/splitters or a message could be sent to the subscriber over a more robust channel (perhaps over the same copper at a slower speed instructing the corrected action that should be taken by the subscriber).

The test unit 113 is particularly suited to determine the suitability for transmitting out-of-band data signals over lines used for voice transmissions such as xDSL transmission technologies. If the test unit 113 indicates that the copper wiring is not suitable for use with a particular xDSL service, the information may be used to provide alternatives to the subscriber. For example, the service provider may offer the subscriber a lower data rate service or may offer to install splitters on the customer's premise to improve performance.

Figure 2:
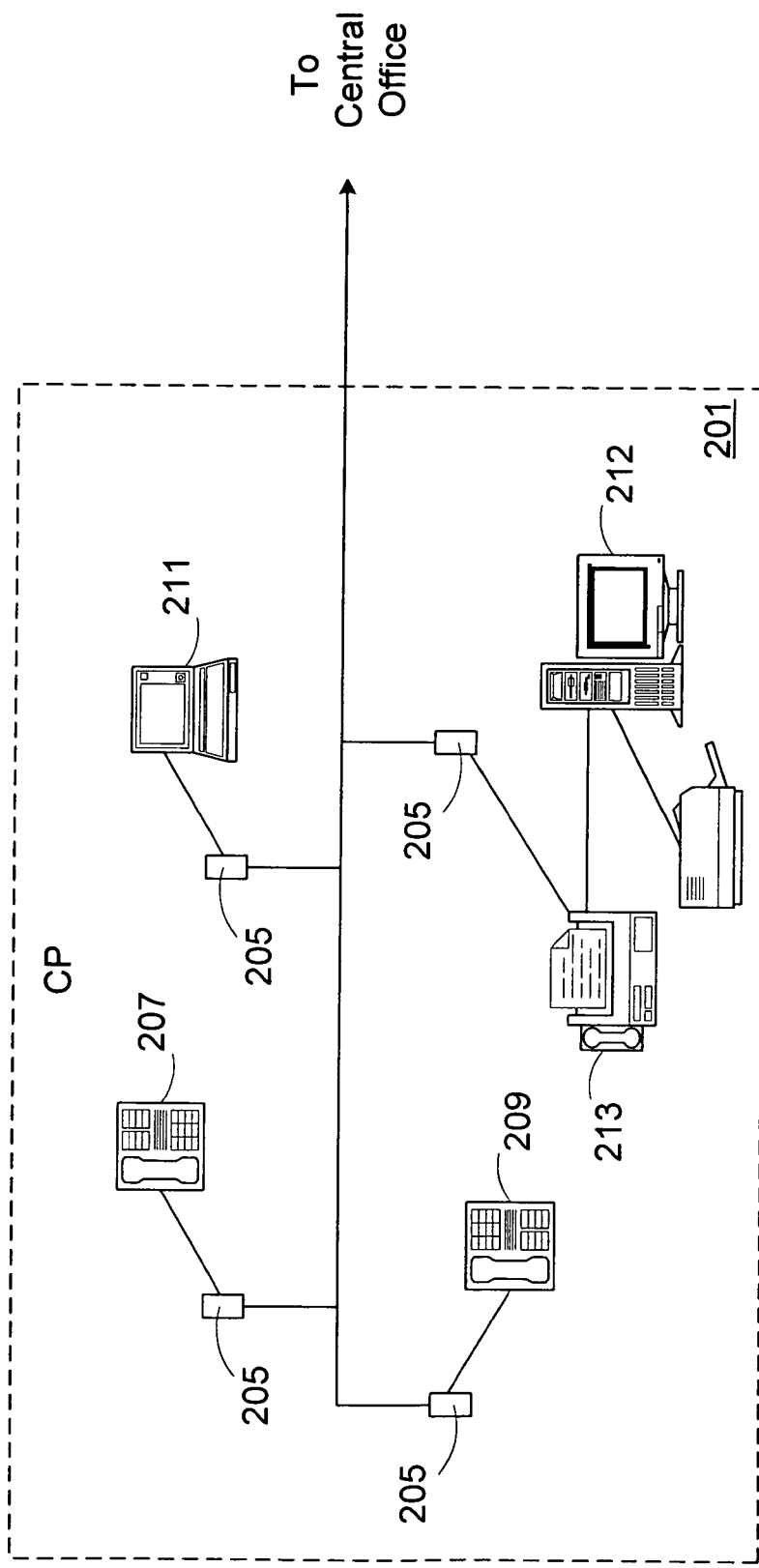
FIG. 2 illustrates a typical wiring scheme that may be seen by a test unit in the system of FIG. 1.

FIG. 2 illustrates an example of the portion of the copper wiring that may be located within a customer premises 201. The internal copper wiring 203 includes a number of jacks that couple telephones, computers, fax machines, and other computer peripheral equipment to the internal copper wiring 203. As noted above, the various equipment coupled to the internal copper wiring, such as telephones 207 and 209, computers 211 and 212, and fax machines 213, influence the suitability of the internal copper wiring 203 for use as a transmission medium for a particular data transmission scheme. In accordance with one embodiment of the invention, the service provider can determine from the CO whether a particular scheme may be used for transmission of voice and data.

Figure 3:
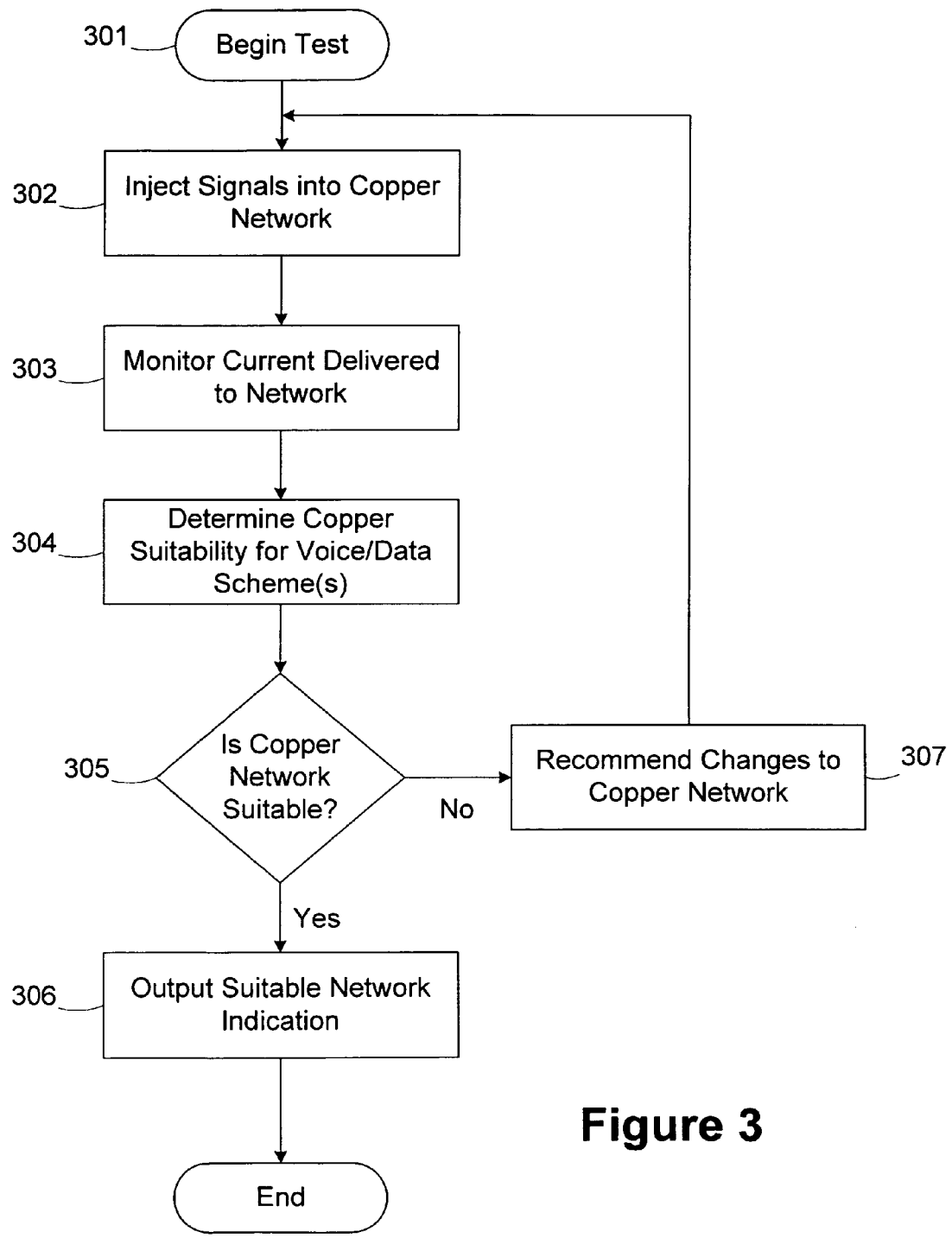
FIG. 3 is a flow diagram of an illustrative test process in accordance with a particular embodiment of the invention.

The process of determining the suitability of a subscriber line for voice band and data band transmission scheme will be described more fully in reference to FIG. 3. To characterize the suitability of a particular copper network formed of, for example, a subscriber line leading to the customer premise and the wiring internal to the premise, the test circuit is coupled to the copper network and the test operation is initiated in block step 301. The test unit 113 injects various signals into the copper network in block 302. The signals represent an out-of-band data signal transmission scheme to be tested. The response of the copper network to the injected signals is monitored in block 303. The monitoring includes monitoring the influences of various user devices coupled to the copper network. The monitored response of the copper network is used to determine the suitability of the copper network for the tested data transmission scheme in block 304. If the copper network is suitable for the tested scheme in block 305, an indication of the network suitability is output in block 306.

If the copper network is not suitable for the tested data transmission scheme in block step 305, changes to the network may be made or recommended in block 307 in effort to make the copper network suitable for a desired data service. Such changes may include the addition of filters or splitters or may indicate that a different type of data service be used. After the changes have been made, the copper network may be tested again in block 302 to determine whether the network is now suitable for the desired transmission scheme. It should be appreciated that more than one data and voice band transmission scheme may be tested. The output produced after the network characterization may include information about a variety of different data transmission schemes and may include a list of schemes for which the network is suitable as well as those for which the network is not suitable.

Figure 4:
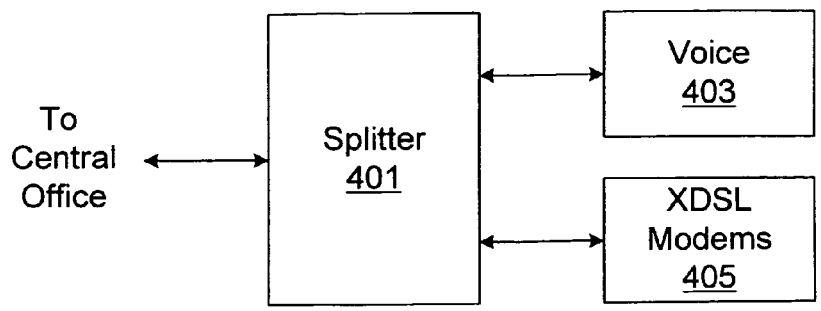
FIG. 4 illustrates a splitter/filter arrangement in accordance with one embodiment of the invention.

As noted above, one possible solution to improve the suitability of a copper network for a particular data transmission scheme is to provide a splitter/filter that isolates the different types of devices provided on the network. One particular arrangement of a splitter/filter 401 is illustrated in FIG. 4. The splitter/filter 401 is coupled to the CO via the copper network. As described above, the splitter/filter 401 includes a voice band port 403 provided in a path including a low pass filter for coupling customer premise equipment used for voice band transmission such as telephones and the like to the copper network. The splitter/filter 401 also has a data band port 405 including a high pass filter that is used to couple data band devices such as computers, peripherals and the like to the copper network.

Figure 5:
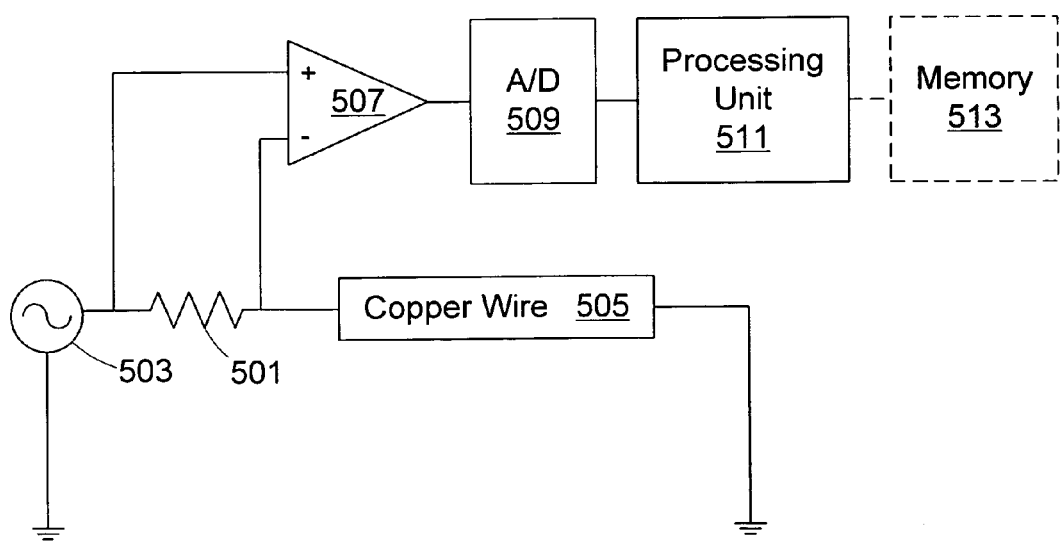
FIG. 5 illustrates a testing system in accordance with another embodiment of the present invention.

FIG. 5 illustrates one particular embodiment of a test circuit that may be used to determine the suitability of a copper wire for use as a transmission medium for various data transmission schemes. In FIG. 5, a resistor 501 is coupled between a signal generator 503 and the copper wire 505. The resistor 501 acts as a current-to-voltage transducer that is used to monitor the current from the signal source 503 drawn by copper wiring 505. The current drawn by the copper wire 505 also provides an indication of the manner in which any user devices coupled with the copper wire 505 may effect the suitability of the wiring for the data transmission scheme. An operational amplifier (op amp) 507 is attached across the resistor 501 and is used to amplify the signal across the resistor 501. The voltage across the resistor 501 is directly proportional to the current that is drawn by the copper wiring 505. By adjusting the voltage level and the frequency of the source signal, one can monitor the current that enters the copper wire network 505 under various conditions that represent various data transmission schemes. The relationship between the input signal and the current drawn by the copper network can be used to characterize the copper wire 505.

The output from the op amp 507 is provided to an analog-to-digital (A/D) converter 509. The A/D converter 509 converts changes in voltage seen across resistor 501 into digital signals that are provided to a processing unit 511. The processing unit 511 use the digital signals to determine how the copper wiring 505 responds to the signals generated by the signal generator 503. In this manner, the processing unit 511 is able to characterize the copper wiring 505 and determine its suitability for use as a transmission medium for the data transmission schemes being tested.

In the above-described embodiment the precise characteristics of the copper network can be obtained by fully analyzing the voltage changes seen by resistor 501. Thus, the suitability for various data transmission schemes may be determined with high precision. Such a suitability characterization process, however, may require extensive calculations, increasing processing overhead and time. In another embodiment of the invention, empirically derived templates are compared with the output from the testing circuit to determine the suitability of the copper network.

Figure 6:
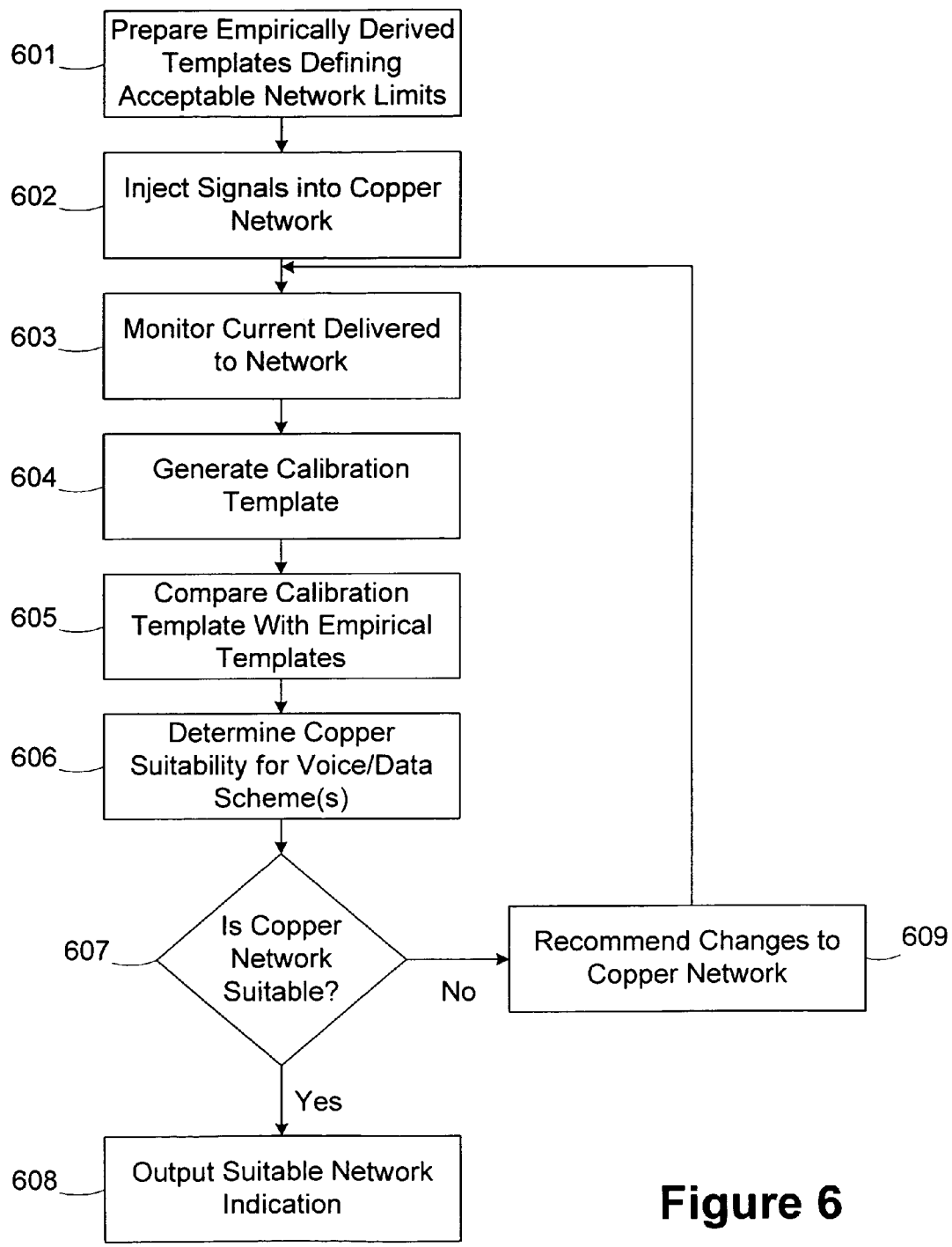
FIG. 6 illustrates a flowchart of a characterization process in accordance with an embodiment of the invention.

An embodiment of the invention that uses empirical templates is illustrated in FIG. 6. In FIG. 6, empirically derived templates are determined in block 601 that define the limits of acceptable responses of the copper network to predetermined test signals. Predetermined test signals are injected onto the copper network being tested in block 602 while monitoring the current delivered to the copper network in block 603. The response of the network to the predetermined test signals is used to generate a calibration template in block 604 that characterizes the response of the network to the predetermined test signals. The calibration template is compared with the empirically derived templates in block 605 and the suitability of the network is determined by examining whether the calibration template is within the limits defined by the empirical template in block 607. It will be appreciated that the empirical templates define the limits for a response of the copper network to the predetermined test signals that are acceptable for a network to be used with a data scheme being tested.

If the network is suitable in block 607, an indication is provided of what types of data transmission schemes are acceptable for the particular copper network in block 608. If the copper network is not suitable in block 607, recommendations may be made to change the copper network to improve its response to the test in block 609. After changes have been made, a new calibration template may be derived and compared with the empirically derived templates to determine whether the network now has suitable characteristics for a particular data transmission scheme in blocks 602–607.

In the above examples, the test unit 113 is provided at the CO 101. It will be appreciated that the test unit 1113 may be provided at other locations. For example, the test unit 113 may be provided at the customer's premise 105 and be used primarily to characterize the internal wiring of the customer's premise 105. The test unit 113 may also be incorporated into a portable test unit used in the field, for example, by a technician. In the field, a test procedure may be run and, when the network is indicated as being unsuitable for a tested scheme, various user devices may be removed and the test rerun. This procedure may be repeated until the device or devices causing problems are identified. Once identified, appropriate action may be taken such as installation of splitters or filters at those devices, for example.

Figure 7:
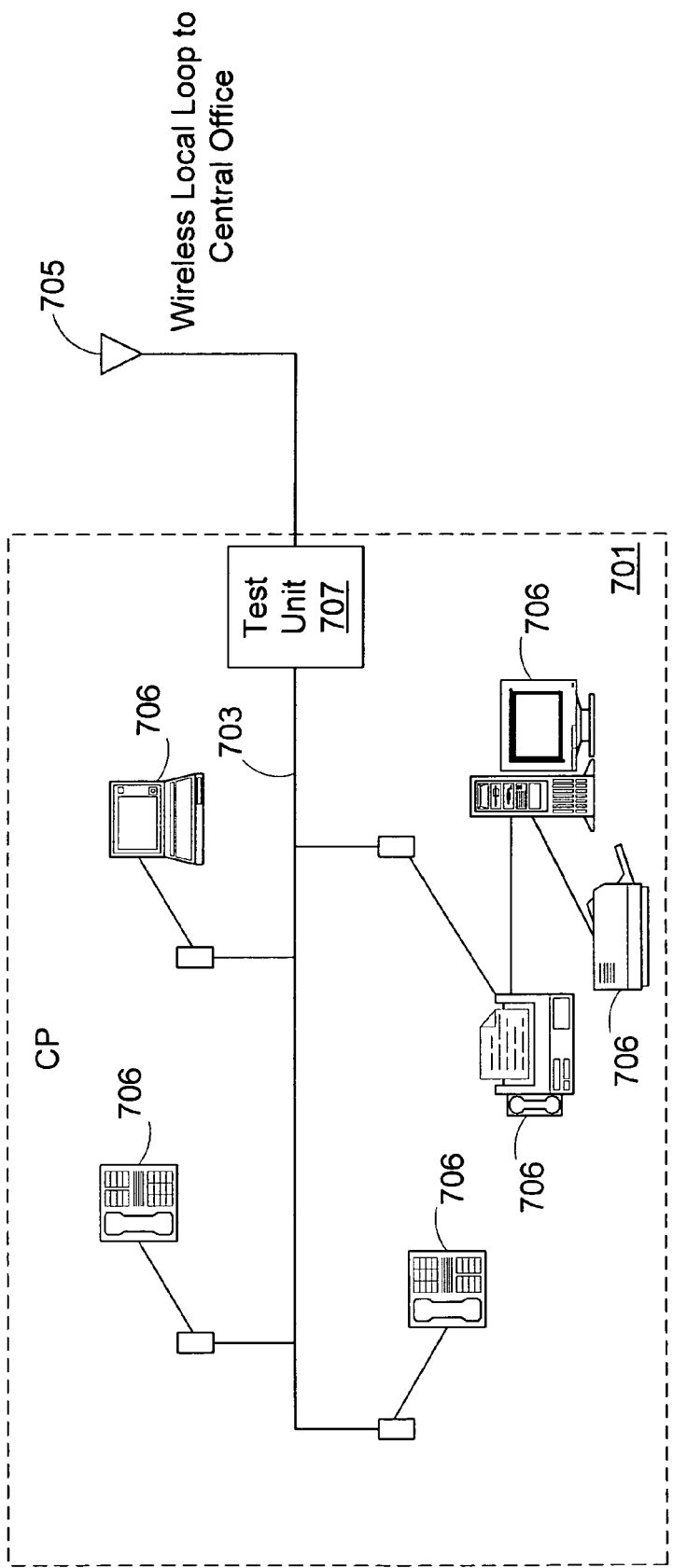
FIG. 7 illustrates another embodiment of a testing system in accordance with the present invention.

In still another embodiment of the invention, a test unit is provided at the customer's premises and is used to monitor the condition of the local copper wiring. For example, the internal copper telephone wiring of a customers premises, in a SOHO environment may be connected to the CO 101 via a wireless local loop. The test unit may be coupled to the copper wiring as a stand alone device or as a device incorporated into a piece of customer premise equipment. One embodiment of such a system is illustrated in FIG. 7. In FIG. 7, a copper wire network 703 within the customer premise 701 is coupled to the CO via a wireless local loop 705. A variety of telephonic and computer related equipment 706 is coupled to the copper wire network 703.

A test unit 707 is also coupled to the wired network 703 and is used to test the suitability of the copper network 703 for a particular out-of-band data transmission scheme. For example, it may be desirable to use an xDSL data transmission scheme as a SOHO local area network (LAN) with a wireless local loop transport to the CO. The use of xDSL as a data transmission scheme for a SOHO network is described in commonly assigned copending patent applications by the same inventor, Ser. No. 08/888,651, entitled "Active Isolation System and Method for Allowing Local and Remote Data Transfers Across a Common Data Link," filed Jul. 7, 1997, and Ser. No. 08/888,654, entitled "Bandwidth Sharing for Remote and Local Data Transfers Using Multicarrier Modulation Over Common Transmission Medium," filed Jul. 7, 1997.

The test unit 707 may be used to monitor the condition of the customer's copper network 703. After the customer premise equipment is installed and voice services are delivered, the customer may wish to add an additional data service that operates on top of the voice service. With the test unit in place, the calibration routine may be used to determine if the network is suitable for the voice band and data band transmissions. In one embodiment, the service provider may invoke the calibration routine via the wireless local loop 705 and, if the test unit 707 indicates that the circuit is not capable of operating a particular service, may provide alternatives such as a lower data rate services or the installation of splitters or filter within the customer's premise.

It is also possible for the test unit 707 to operate in conjunction with a SOHO based LAN that operates over the existing copper network 703. A PC, for example, using a specialized xDSL modem may be coupled to the local wire network 703 and be provided with the ability to perform calibration measurements to determine if the copper network 703 is suitable for supporting data and voice band transmissions without additional splitters or other modifications. In this manner, PCs within the SOHO environment may be networked together using the existing copper infrastructure, while allowing simultaneous voice operation without interference. This type of system is more fully described in the above reference co-pending patent applications.

In the above embodiment where the existing copper infrastructure is used to construct a SOHO network, calibration in accordance with the present invention may be integrated into the SOHO modem in order to actively monitor the characteristics of the copper network. In such an embodiment, the SOHO modem may alter the modulation scheme (for example, slow the data rate down) to avoid the demodulation of signals that would appear in the voice band. Alternatively, the SOHO modem may inform the user that the circuit characteristics are not suitable for further operation without the addition of splitters or filters.

Figure 8:
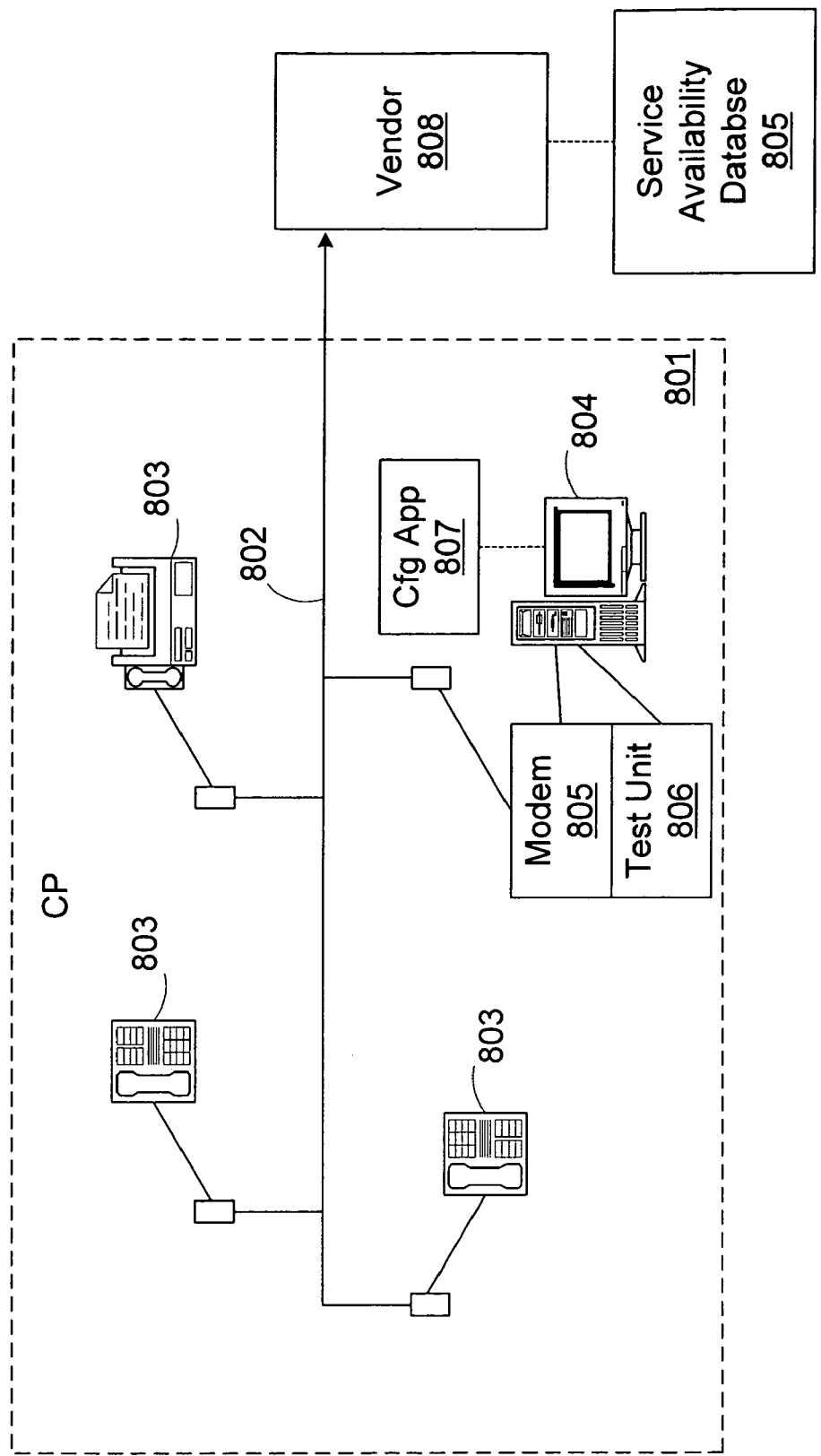
FIG. 8 illustrates a communications system in accordance with an embodiment of the present invention.

In yet another embodiment of the invention, as illustrated in FIG. 8, a customer premises 801 includes a copper network 802 having a plurality of telephonic and computer related equipment 803 (i.e., collectively referred to as telephonic devices) and a computer 804 attached thereto. The computer 804 includes a modem 805 and a test unit 806. The modem 805 and the test unit 806 may be either internal or external to the computer 804. Moreover, the test unit 806 may be incorporated into the modem 805 (i.e., on a common circuit board). The test unit 806 may be capable of operation independent of the computer 804, or alternatively, the test unit 806 may operate in conjunction with software executing on the computer 804. The modem 805 may be capable of supporting both an out-of-band data transmission scheme (e.g., xDSL) and a voice band transmission scheme (e.g., V90) over the copper network 802.

The test unit 806 is adapted to determine the suitability of the copper network 802 for supporting the particular out-of-band data transmission scheme. For example, a user may purchase the computer 804 with the modem 805 and test unit 806 previously installed. Alternatively, the user may purchase a communications upgrade package including the modem 805 and the test unit 806 for installation into the computer 804. In the illustrated embodiment, the computer 804 is adapted to execute a configuration application program 807 to determine the capabilities of the customer premise 801 and the service types available to the user at the particular physical location. The computer 804 employs the voice band capabilities of the modem 805 to establish a connection with a vendor 808. The configuration application program 807 may be configured to call a predetermined number (e.g., a toll-free number established by a vendor of the computer 804 or communications upgrade package). Alternatively, the modem 805 may establish a connection to the Internet (e.g., using an access number established by the vendor 807), and communicate with the vendor 808 using a web browser interface to a configuration web site.

Prior to or after establishing the connection with the vendor 808, the configuration application program 807 queries the user to determine the physical location of the computer 804 (e.g., address, zip code, phone number, etc.). Based on the physical location information, the vendor 808 may access a service availability database 809 to determine the possible services available to the user (e.g., xDSL at various bandwidths, dial-up modem, etc.). Alternatively, the configuration application program 807 may maintain its own service availability database (not shown) that may be automatically updated by the vendor 808.

The test unit 806 tests the suitability of the copper network 802 for a particular out-of-band data transmission scheme. In one embodiment, the test unit 806 may only test those out-of-band data transmission schemes available to the user based on the physical location. Based on the results of the suitability tests, the configuration application program 807 may inform the user of the service possibilities.

In one embodiment, the configuration application program 807 may query the user as to the number and type of the other telephonic and computer related equipment 803 coupled to the copper network 802. The configuration application program 807 may then direct the user to remove certain of the telephonic and computer related equipment 803 from the copper network 802 and repeat the suitability tests after each iteration. Using the information gained regarding the interference caused by the various devices 806 from the iterative tests, the configuration application program 807 may recommend that local splitters or filters be installed between the copper network 802 and the particular interfering device 803. Along with providing the service availability information, the vendor 808 may provide the opportunity for the user to purchase the appropriate filters and/or splitters over the web site and have them shipped directly to the user. Alternatively, the vendor 808 could pass the interfering device information to a local installation service responsible for activating the service requested by the user. The local installation service would then have the proper equipment on-hand for the installation. The collection of the interfering device information may occur prior to or after establishing the connection with the vendor 808. If the configuration of the customer premise 801 changes after initiation of a particular out-of-band service, the user may use the configuration application program 807 and test unit 806 to retest the suitability of the copper network 802.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

The invention claimed is:

1. A method for determining the suitability of a copper line, used for transmitting voice band signals and having one or more user devices coupled thereto for transmitting signals on the copper line, for use in transmitting data signals out-of-band with the voice band signals, the method comprising:

applying a test signal at one point in the copper line, the test signal having a known relationship to a particular out-of-band data transmission scheme;

monitoring a response of the copper line to the test signal, as influenced by the one or more user devices, wherein the monitoring takes place at about the point where the test signal was applied; and determining the suitability of the copper line for data transmission using the particular out-of-band data transmission scheme based on the monitored response of the copper line.

2. The method of claim 1, wherein the particular out-of-band data transmission scheme comprises a digital subscriber line (xDSL) transmission scheme.

3. The method of claim 2, wherein the particular out-of-band data transmission scheme comprises an asymmetric digital subscriber line (ADSL) transmission scheme.

4. The method of claim 1, wherein the one or more user devices comprise a plurality of user devices including at least one telephone and at least one computer.

5. The method of claim 4, further comprising determining a need for a filter at a location of at least one of the telephone and the computer to separate voice band signals and out-of-band data signals transmitted on the copper line based on the monitored response of the copper line.

6. The method of claim 1, wherein the copper line includes a copper network within a subscriber's premise used to provide telephone service to the subscriber.

7. The method of claim 6, wherein the copper line further includes a subscriber line connecting the subscriber's premise to a central office of a telephone service provider.

8. The method of claim 1, wherein determining the suitability of the copper line includes determining whether any of the one or more user devices has a non-linear characteristic based on the monitored response of the copper line.

9. The method of claim 1, wherein determining the suitability of the copper line includes comparing the monitored response of the copper line with an empirically derived template defining a suitable response limit for the copper line.

10. The method of claim 1, wherein applying the test signal comprises injecting a modulated signal on the copper line at a frequency corresponding to the particular out-of-band data transmission scheme.

11. The method of claim 10, wherein monitoring the response of the copper line includes determining whether the modulated signal at the frequency corresponding to the particular out-of-band data transmission scheme is demodulated.

12. The method of claim 11, wherein determining the suitability of the copper line includes comparing the monitored response of the copper line with an empirically derived template defining a suitable response limit for the copper line.

13. A device for determining the suitability of a copper line, used for transmitting voice band signals and having one or more user devices coupled thereto for transmitting signals on the copper line, for use in transmitting data signals out-of-band with the voice band signals, the device comprising:

a signal generator for coupling to the copper line at one point, the signal generator providing a test signal to the copper line, the test signal having a known relationship to a particular out-of-band data transmission scheme;

a monitoring circuit coupled to the copper line proximate the one point to monitor a response of the copper line to the test signal at about said one point, as influenced by the one or more user devices; and a processing unit coupled to the monitoring circuit to receive the monitored response of the copper line to the test signal and to output an indication of the suitability of the copper line for use in transmitting data signals using the particular out-of-band data transmission scheme.

14. The device of claim 13, wherein the copper line includes a copper network within a subscriber's premise used to provide telephone service to a subscriber associated with the subscriber's premise.

15. The device of claim 14, wherein the copper line further includes a subscriber line local loop connecting the subscriber's premise to a central office of a telephone service provider.

16. The device of claim 13, wherein the monitoring circuit comprises a current-to-voltage transducer that monitors an amount of current delivered by the signal generator into the copper line.

17. The device of claim 13, wherein the monitoring circuit comprises:

a resistor coupled in series between the signal generator and the copper line to monitor an amount of current delivered by the signal generator into the copper line;

an operational amplifier having a first input coupled to a first side of the resistor and a second input coupled to a second side of the resistor and having an output to provide an output signal that is directly proportional to the current drawn from the signal generator by the copper line; and an analog-to-digital converter coupled to the output of the operational amplifier, the output signal from the output of the operational amplifier being provided to the processing unit as the response of the copper line to the test signal.

18. The device of claim 13, further comprising a memory arrangement coupled to the processing unit for storing an empirically derived template defining a limit for a suitable response of the copper line to the test signals for the particular out-of-band data transmission scheme.

19. The device of claim 18, wherein the processor is adapted to compare the monitored response of the copper line with the empirically derived template and output an indication that the copper line is suitable for the particular out-of-band data transmission scheme when the monitored response is within the limit defined by the empirically derived template.

20. A method for determining the suitability of a copper line, used for transmitting voice band signals and having one or more user devices coupled thereto for transmitting signals on the copper line, for use in transmitting data signals out-of-band with the voice band signals, the method comprising:

applying a test signal to the copper line at one point within a subscriber's premises, the test signal having a known relationship to a particular out-of-band data transmission scheme;

monitoring within the subscriber's premises at the one point the test signal was applied a response of the copper line to the test signal, as influenced by the one or more user devices; and determining the suitability of the copper line for data transmission using the particular out-of-band data transmission scheme based on the monitored response of the copper line.

21. A test unit for determining the suitability of a copper line, used for transmitting voice band signals and having one or more user devices coupled thereto for transmitting signals on the copper line, for use in transmitting data signals out-of-band with the voice band signals, a device comprising:

a signal generator for coupling to the copper line at one point, the signal generator providing a test signal to the copper line, the test signal having a known relationship to a particular out-of-band data transmission scheme;

a monitoring circuit coupled to the copper line proximate the same point as the signal generator to monitor a response of the copper line to the test signal, as influenced by the one or more user devices; and a processing unit coupled to the monitoring circuit to receive the monitored response of the copper line to the test signal and to output an indication of the suitability of the copper line for use in transmitting data signals using the particular out-of-band data transmission scheme.

22. A communications system, comprising:

a communication line;

a plurality of user devices coupled to the communication line; and a computer system coupled to the communication line and being adapted to contact a vendor for supplying service using the out-of-band data transmission protocol over the modem, provide the vendor with physical location information associated with the communication line, and receive service availability data based on the physical location information, the computer system comprising:

a modem adapted to communicate over the communication line using an out-of-band data transmission protocol; and a test unit adapted to determine the suitability of the communication line for use in transmitting data signals using the out-of-band data transmission protocol, the test unit being adapted to provide a test signal having a known relationship to the out-of-band data transmission protocol at a point on the communication line, monitor a response at about said point of the communication line to the test signal as influenced by the user devices, and output an indication of the suitability of the communication line for use in transmitting data signals using the out-of-band data transmission protocol based on the response.

23. A communications system, comprising:

a communication line;

a plurality of user devices coupled to the communication line; and a computer system coupled to the communication line, the computer system comprising:

a modem adapted to communicate over the commnunication line using an out-of-band data transmission protocol; and a test unit adapted to determine the suitability of the communication line for use in transmitting data signals using the out-of-band data transmission protocol, the test unit being adapted to provide a test signal having a known relationship to the out-of-band data transmission protocol on the communication line, monitor a response of the communication line to the test signal as influenced by the user devices, and output an indication of the suitability of the communication line for use in transmitting data signals using the out-of-band data transmission protocol based on the response, wherein, the computer system is adapted to instruct a user to disconnect certain ones of the user devices from the communication line, the test unit is adapted to iterate its functions of providing the test signal, monitoring the response, and outputting the indication of the suitability of the communication line for each disconnection, and the computer system is adapted to identify an interfering device from among the user devices based on the iterative responses generated by the test unit, and recommend installation of a local filtering device between the interfering device and the communication line based on the monitored response of the communication line.

24. The system of claim 23, wherein the particular out-of-band data transmission protocol comprises a digital subscriber line (xDSL) transmission protocol.

25. The system of claim 23, wherein the local filtering device comprises at least one of a filter and a splitter.

26. The system of claim 23, wherein the test unit is adapted to store an empirically derived template defining a limit for a suitable response of the communication line to the test signal for the particular out-of-band data transmission protocol, compare the monitored response of the communication line with the empirically derived template, and output an indication that the communication line is suitable for the particular out-of-band data transmission protocol in response to the monitored response being within the limit defined by the empirically derived template.

27. A method for determining the suitability of a communication line for transmitting data using an out-of-band data transmission protocol, the communication line having a plurality of user devices attached thereto, and the method comprising:

providing a test signal on the communication line having a known relationship to the out-of-band data transmission protocol;

monitoring a response of the communication line to the test signal as influenced by the user devices;

determining the suitability of the communication line for use in transmitting data signals using the particular out-of-band data transmission protocol based on the response;

disconnecting at least one of the user devices from the communication line;

repeating the providing, monitoring, and determining steps to determine if the at least one user device disconnected from the communication line is an interfering device;

contacting a vendor for supplying service using the out-of-band data transmission protocol;

providing the vendor with physical location information associated with the communication line; and receiving service availability data based on the physical location information.

28. A method for determining the suitability of a communication line for transmitting data using an out-of-band data transmission protocol, the communication line having a plurality of user devices attached thereto, and the method comprising:

providing a test signal on the communication line having a known relationship to the out-of-band data transmission protocol;

monitoring a response of the communication line to the test signal as influenced by the user devices;

determining the suitability of the communication line for use in transmitting data signals using the particular out-of-band data transmission protocol based on the response;

disconnecting at least one of the user devices from the communication line;

repeating the providing, monitoring, and determining steps to determine if the at least one user device disconnected from the communication line is an interfering device;

iteratively disconnecting each of the user devices and repeating the providing, monitoring, and determining steps to determine if any of the user devices disconnected from the communication line are interfering devices; and determining a need for a local filtering device at a location of at least one of the user devices to separate voice band signals and out-of-band data signals transmitted on the communication line based on the response.

29. The method of claim 28, wherein providing the test signal comprises providing the test signal having a known relationship to a digital subscriber line (xDSL) transmission protocol.

30. The method of claim 28, further comprising installing the local filtering device been the interfering device and the communication line.

31. The method of claim 30, wherein installing the local filtering device comprises installing at least one of a filter and a splitter.

32. The method of claim 28, further comprising:

comparing the monitored response of the communication line with an empirically derived template defining a limit for a suitable response of the communication line to the test signal for the particular out-of-band data transmission protocol; and determining that the communication line is suitable for the particular out-of-band data transmission protocol in response to the monitored response being within the limit defined by the empirically derived template.

33. The method of claim 28, wherein monitoring the response of the communication line to the test signal includes determining whether any of the user devices has a non-linear characteristic.

34. The method of claim 28, wherein providing the test signal comprises injecting a modulated signal on the communication line at a frequency corresponding to the particular out-of-band data transmission protocol.

35. The method of claim 34, wherein monitoring the response of the communication line includes deterring whether the modulated signal at the frequency corresponding to the particular out-of-band data transmission protocol is demodulated.

36. A method for determining the suitability of a communication line for transmitting data using an out-of-band data transmission protocol, the communication line having a plurality of user devices attached thereto, and the method comprising:

monitoring a response of the communication line to a test signal as influenced by the user devices;

disconnecting at least one of the user devices from the communication line;

repeating the monitoring to determine if the at least one user device disconnected from the communication line is an interfering device; and determining a need for a local filtering device at a location of at least one of the user devices based on the monitored responses.

37. The method of claim 36, further comprising iteratively disconnecting each of the user devices and repeating the monitoring to determine if any of the user devices disconnected from the communication line are interfering devices.

* * * * *